United States Patent [19]

Van Driesen

[11] Patent Number: 5,217,935
[45] Date of Patent: Jun. 8, 1993

[54] PROCESSES FOR REGENERATING CATALYSTS CONTAMINATED WITH CARBONACEOUS MATERIALS

[75] Inventor: Roger Van Driesen, Titusville, N.J.

[73] Assignee: ABB Lummus Crest Inc., Bloomfield, N.J.

[21] Appl. No.: 877,231

[22] Filed: May 1, 1992

[51] Int. Cl.$^5$ .............. B01J 38/70; B08B 7/00; C02F 1/68

[52] U.S. Cl. .................. 502/23; 134/20; 134/39; 210/761; 431/3; 502/26

[58] Field of Search .............. 502/23, 26; 210/761, 210/762; 110/238; 134/20, 39; 75/713

[56] References Cited

U.S. PATENT DOCUMENTS

| | | | |
|---|---|---|---|
| 3,956,088 | 5/1976 | Fassell et al. | 75/713 |
| 4,017,421 | 4/1977 | Othmer | 210/642 |
| 4,123,500 | 10/1978 | Acres et al. | 502/23 |
| 4,604,957 | 8/1986 | Cederquist | 110/238 |

FOREIGN PATENT DOCUMENTS 53-113287 10/1978 Japan ..................... 502/23

*Primary Examiner*—Paul E. Konopka
*Attorney, Agent, or Firm*—Elliot M. Olstein; Raymond J. Lillie

[57] ABSTRACT

Processes for the regeneration of catalysts, such as hydrogenation catalysts, and the defouling of objects, which are contaminated with carbonaceous deposits. The catalyst or object is contacted with water, oxygen-containing gas, and at least one alkaline material maintained at a pH of at least 7.0, and at a temperature and pressure sufficient to combust at least a portion of the carbonaceous deposits. The process of the present invention enables one to remove carbonaceous deposits from catalysts or contaminated the leaching of metals from the catalysts or objects by acidic by-products of the combustion process.

7 Claims, No Drawings

PROCESSES FOR REGENERATING CATALYSTS CONTAMINATED WITH CARBONACEOUS MATERIALS

This invention relates to the regeneration of catalysts, such as, for example, hydrogenation catalysts, and the defouling of objects contaminated with carbonaceous materials, whereby carbonaceous materials are burned from a catalyst or from the surface of an object contaminated with such materials. More particularly, this invention relates to improvements in such regeneration and defouling processes wherein an alkaline material is added to the regeneration or defouling medium.

Regeneration of catalysts, and in particular hydrogenation catalysts, and defouling of objects, such as for example, thermal cracking units, hydrocracking units, and polymerization units, have been carried out by contacting the deactivated catalyst or the contaminated object with water and an oxygen-containing gas. The deactivated catalyst or contaminated object is contacted with the water and oxygen-containing gas at a superatmospheric pressure and elevated temperature sufficient to maintain liquid phase water in contact with the catalyst or the contaminated object. Under such conditions, carbonaceous deposits on the catalyst or on the object, are rapidly combusted and the heat of combustion is absorbed by the liquid water. The absorption of the heat given off in the combustion by the water avoids excessive temperature increases.

U.S. Pat. No. 3,557,019 discloses the use of water and oxygen-containing air for the regeneration of the hydrogenation catalyst. The regeneration may be carried out at temperatures from about 400° F. to about 700° F., and a pressure of from about 300 psig to about 5,000 psig. Catalysts which may be regenerated include cobalt, iron, molybdenum, nickel, and tungsten. These catalysts, as well as their sulfides and oxides, may be used alone or together with other catalysts or naturally occurring clays, or such catalysts may be supported on a suitable base such as alumina, silica, or silica-alumina.

U.S. Pat. No. 3,420,711 discloses the defouling of equipment utilized in many types of chemical processes, such as thermal cracking units, hydrocracking units, and polymerization units. The equipment is contacted with a mixture of an oxygen-containing gas and water as hereinabove described. The contacting takes place at an elevated temperature and at a superatmospheric pressure sufficient to maintain the water in the liquid phase. The carbonaceous deposits are thus rapidly combusted and the liquid water absorbs the heat of combustion. The contacting temperature may be from about 400° F. to about 700° F., and the defouling may take place at a pressure of from about 300 psig to about 5,000 psig.

Various gaseous products, such as carbon monoxide (CO) and carbon dioxide ($CO_2$), are formed from the combustion of the carbonaceous deposits. Carbon dioxide in the presence of water, however, forms carbonic acid, which may leach hydrogenating metals such as cobalt, molybdenum, nickel, or vanadium from a hydrogenation catalyst. In the defouling of objects such as those hereinabove mentioned, the acid may leach certain metals from the structures of such objects.

It is therefore an object of the present invention to provide processes for the regeneration of hydrogenation catalysts and for the defouling of objects whereby essential metals are not leached during the regeneration or defouling process.

In accordance with an aspect of the present invention, there is provided a process for regenerating a catalyst contaminated with combustible carbonaceous deposits. The process comprises contacting the catalyst with an oxygen-containing gas, water, and at least one alkaline material maintained at a pH of at least 7.0, and at a temperature and pressure sufficient to maintain liquid phase water in contact with the catalyst to combust thereby at least a portion of the carbonaceous deposits and provide a regenerated catalyst having reduced amounts of carbonaceous material deposited thereon. In general, the oxygen-containing gas, water, and at least one alkaline material are maintained at a pH no greater than 10.5.

The at least one alkaline material preferably is a gaseous alkaline material In one embodiment, the alkaline material is ammonia. In another embodiment, the alkaline material is an amine compound, such as, but not limited to aromatic amines, aliphatic amines and alcoholic amines. Preferred amine compounds include alcoholic amines, such as ethanolamine and diethanolamine.

The catalyst which is regenerated is preferably a hydrogenation catalyst. Hydrogenation catalysts which may be regenerated include, hydrogenating metals, which include, but are not limited to, cobalt, iron, molybdenum, nickel, tungsten, and vanadium, as well as their sulfides and oxides. The hydrogenating metal preferably is supported on a suitable base such as alumina, silica, silica-alumina, or a zeolite catalyst. A preferred support is an alumina support. The hydrogenation catalyst may be used alone or together with other catalysts, such as naturally occurring clays, or in combination with each other.

Although the scope of this aspect of the present invention is not to be limited to any theoretical reasoning, it is believed that, by adding at least one alkaline material to the water, the water will remain neutral or alkaline, and the leaching of metals by acidic by-products of the combustion of the carbonaceous deposits is prevented. Thus, catalyst will not be lost during the regeneration process.

Preferably, the regeneration is conducted at an elevated temperature and a superatmospheric pressure to maintain liquid phase water in contact with the catalyst during regeneration. Under such conditions, the carbonaceous deposits on the catalyst are rapidly combusted, and the heat of combustion is absorbed by the liquid water. The absorption by the water of the heat given off in the combustion avoids excessive temperature increases. Also, the maintenance of liquid water in contact with the catalyst during regeneration has the advantage of scrubbing a certain amount of carbonaceous material from the catalyst before complete combustion has occurred.

In one embodiment, the temperature at which the regeneration of the catalyst is carried out may be up to about 700° F., which is approximately the critical temperature at which water ceases to exist in the liquid phase, irrespective of pressure. Because the heat of combustion given off by the regeneration is absorbed in liquid water, thereby increasing the temperature of the water, the temperature at which the water is charged to the regeneration zone should be sufficiently below 700° F. Preferably, the regeneration is carried out at a temperature of from about 400° F. to about 700° F., more preferably from about 500° F. to about 650° F.

The pressure at which the catalyst regeneration is carried out should be high enough to insure the presence of liquid water in contact with the catalyst at the operating temperature. Preferably, the regeneration may be carried out at a pressure of from about 300 psig to about 5,000 psig, and more preferably from about 1,000 psig to about 4,000 psig. To provide a continuous phase of liquid water throughout substantially the entire volume of the batch of catalyst being regenerated, it is desirable to select an operating temperature and pressure such that the vapor pressure of water at the operating temperature is less than about 80% of the operating pressure, more preferably less than about 60% of the operating pressure.

The oxygen containing gas which is employed may be substantially pure molecular oxygen, air, or oxygen-enriched air. Preferably, the regeneration is carried out at an oxygen partial pressure of at least about 10 psi, and more preferably from about 100 psi to about 500 psi. The partial pressure of the alkaline gases preferably is at least 10 psi and more preferably between 20 psi and 50 psi.

The regeneration of the catalyst may be carried out by a number of suitable procedures. In a preferred procedure, the oxygen-containing gas, water, and the at least one alkaline material are passed upwardly through a bed of deactivated catalyst particles at a sufficient velocity to expand the volume of the catalyst bed and cause random movement of the catalyst particles. In general, it is preferred to pass the oxygen containing gas, water, and at least one alkaline material upwardly through the bed of deactivated catalyst at a liquid upflow velocity such that the catalyst bed is expanded between about 5% and 300%, based on the unexpanded or settled volume of the bed. In such an expanded or ebullated bed, the catalyst is in a state of constant and random motion induced by the velocity of the upflowing water, oxygen-containing gas, and at least one alkaline material. This motion enables efficient contacting of individual catalyst particles with the oxygen-containing gas and the at least one alkaline material, and furthermore is conducive to a scrubbing action by the water on the catalyst particles to remove a certain amount of carbonaceous contaminants from the particles.

The regeneration may also be conducted in a fixed bed of catalyst where the gases and liquid are introduced at the top of the bed and flow down through the bed. A recycle of water may be employed at sufficient rates to control and maintain the temperature rise, which in general is no more than 50° F.

In accordance with another aspect of the present invention, there is provided a process for defouling an object of combustible carbonaceous deposits. The process comprises contacting the object fouled with carbonaceous deposits with water, an oxygen-containing gas, and at least one alkaline material maintained at a pH of at least 7.0, and at a temperature and pressure sufficient to combust the carbonaceous deposits and to maintain the object in contact with liquid phase water to combust thereby at least a portion of said carbonaceous deposits. Preferably, the water, oxygen-containing gas, and at least one alkaline material are maintained at a pH of from about 7.0 to about 10.5.

The at least one alkaline material preferably is a gaseous material and may be ammonia or an amine compound, as hereinabove described.

Objects which may be defouled in accordance with the present invention include any objects susceptible to fouling by the formation of carbonaceous components. Such objects include, but are not limited to, thermal cracking units, hydrovisbreakers, hydrocracking units, and polymerization units.

Preferably, the defouling is conducted under conditions similar to those under which the catalyst regeneration is conducted, i.e., at an elevated temperature and superatmospheric pressure so as to maintain liquid phase water in contact with the object being defouled. These conditions enable the carbonaceous deposits to be rapidly combusted, and the heat of combustion is adsorbed by the water, thus avoiding excessive temperature increases. The maintenance of the water in contact with the object during the defouling process also provides for scrubbing of a certain amount of carbonaceous material from the object before complete combustion has occurred.

The defouling may be accomplished at a temperature up to about 700° F., preferably from about 400° F. to about 700° F., and more preferably from about 500° F. to about 650° F., and at a pressure of from about 300 psig to about 5,000 psig, preferably from about 700 psig to about 4,000 psig.

The oxygen-containing gas may be substantially pure molecular oxygen, air, or oxygen-enriched air.

In a preferred embodiment, the object is maintained in contact with a continuous phase of liquid water having the oxygen-containing gas and/or at least one alkaline material dissolved or dispersed therein. The object may be maintained in substantially complete contact with a continuous phase of liquid water by various methods.

In one embodiment, water is pumped into the object and the effluent water is collected in suitable separating equipment. The water is separated from any impurities and then passed to whatever effluent water system is available in the plant which includes the object.

The invention will now be described with respect to the following example; however, the scope of the present invention is not intended to be limited thereby.

EXAMPLE

A used residual particulate alumina-based hydrocracking catalyst and containing carbon deposits and having the following characteristics:

| | |
|---|---|
| Wt. % carbon | 20 |
| Activity rating (percent of fresh catalyst) | 44 |
| Surface area (m$^2$/g) | 110 |
| Wt. % cobalt | 1.8 |
| Wt. % molybdenum | 8.4 | is regenerated with air and water at a total pressure of 1,500 psi and a temperature of 650° F.

After regeneration, the catalyst had the following characteristics:

| | |
|---|---|
| Wt. % carbon | 0.3 |
| Activity rating | 60 |
| Surface area (m$^2$/g) | 280 |
| Wt. % cobalt | 1.1 |
| Wt. % molybdenum | 5.5 |

Another sample of the used catalyst having the characteristics hereinabove described was regenerated with air, water and ammonia, at a total pressure of 1,500 psi, a temperature of 650° F., and a partial pressure of 30 psi of ammonia. After regeneration, the catalyst had the following characteristics:

| Wt. % carbon | 0.3 |
|---|---|
| Activity rating | 90 |
| Surface area (m²/g) | 280 |
| Wt. % cobalt | 2.0 |
| Wt. % molybdenum | 9.9 |

The above results indicate that one achieves improved catalyst regeneration when the catalyst is reactivated in a medium containing air, water and ammonia as compared to air and water.

Advantages of the present invention include the ability to combust carbonaceous contaminants of catalyst or chemical processing units such as cracking units or polymerization units without leaching essential metals from the catalysts or processing units, thereby preventing the loss of catalyst or the loss of metal from the structure of the processing unit. Such is accomplished by keeping the water neutral or alkaline with the at least one alkaline material which is added to the water and oxygen-containing gas.

It is to be understood, however, that the scope of the present invention is not to be limited to the specific embodiments described above. The invention may be practices other than as particularly described and still be within the scope of the accompanying claims.

What is claimed is:

1. A process for regenerating a catalyst comprising a hydrogenating metal or oxides and sulfides thereof supported on a base selected from the group consisting of alumina, silica, silica-alumina and zeolite contaminated with combustible carbonaceous deposits, comprising: contacting said catalyst with an oxygen-containing gas, water and at least one alkaline material form the group consisting of ammonia and amines, maintained at a pH of at least 7.0, and at a temperature and pressure sufficient to maintain liquid phase water in contact with said catalyst to combust thereby at least a portion of said carbonaceous deposits and provide a regenerated catalyst having reduced amounts of carbonaceous material deposited thereon.

2. The process of claim 1 wherein said regeneration is conducted at a temperature of from about 400° F. to about 700° F.

3. The process of claim 2 wherein said regeneration is conducted at a temperature of from about 500° F. to about 650° F.

4. The process of claim 1 wherein said regeneration is conducted at a pressure of from about 300 psig to about 5,000 psig.

5. The process of claim 4 wherein said regeneration is conducted at a pressure of from about 1,000 psig to about 4,000 psig.

6. The process of claim 1 wherein said oxygen-containing gas, water, and at least one alkaline material is maintained at a pH no greater than 10.5

7. The process of claim 1 wherein said catalyst is a hydrogenation catalyst including a hydrogenating metal selected from the group consisting of cobalt, iron, molybdenum, nickel, tungsten and vanadium, and sulfides and oxides thereof.

* * * * *